US006985925B2

(12) United States Patent
Ogawa (10) Patent No.: US 6,985,925 B2
(45) Date of Patent: Jan. 10, 2006

(54) SERVER DEVICE AND METHOD FOR PROVIDING E-MAIL SERVICE, AND INFORMATION RECORDING MEDIUM RECORDING A PROGRAM FOR REALIZING THE SERVICE

(76) Inventor: Hideharu Ogawa, 6-18, Osaki 2-chome, Shinagawa-ku, Tokyo 141-0032 (JP)

( * ) Notice: Subject to any disclaimer, the term of this patent is extended or adjusted under 35 U.S.C. 154(b) by 775 days.

(21) Appl. No.: 09/938,807

(22) Filed: Aug. 24, 2001

(65) Prior Publication Data
US 2002/0026488 A1  Feb. 28, 2002

(30) Foreign Application Priority Data
Aug. 24, 2000  (JP)  .............................. 2000-254203

(51) Int. Cl.
*G06F 15/16*  (2006.01)
(52) U.S. Cl. ...................................... 709/206; 709/245
(58) Field of Classification Search ........ 709/203–207, 709/238–245
See application file for complete search history.

(56) References Cited

U.S. PATENT DOCUMENTS

| 5,619,648 A | * | 4/1997 | Canale et al. ............... 709/206 |
| 5,752,059 A | * | 5/1998 | Holleran et al. ............ 709/245 |
| 5,822,526 A | * | 10/1998 | Waskiewicz ................ 709/206 |
| 5,864,684 A | * | 1/1999 | Nielsen ...................... 709/206 |
| 5,999,967 A | * | 12/1999 | Sundsted ..................... 709/206 |
| 6,023,723 A | * | 2/2000 | McCormick et al. ....... 709/206 |
| 6,421,709 B1 | * | 7/2002 | McCormick et al. ....... 709/206 |
| 6,480,885 B1 | * | 11/2002 | Olivier ....................... 709/207 |
| 6,691,156 B1 | * | 2/2004 | Drummond et al. ........ 709/206 |

\* cited by examiner

*Primary Examiner*—Le Hien Luu
(74) *Attorney, Agent, or Firm*—Mitchell P. Brook; Luce, Forward, Hamilton & Scripps, LLP (57) ABSTRACT

A receiver receives e-mails. In the case where an address of an e-mail is a user's e-mail address which is managed by another e-mail server device, a transfer unit transfers the e-mail to the another e-mail server device. In the case where an address of an e-mail is a user's e-mail address which is managed by an e-mail server device including an inquiry unit, this inquiry unit inquires of the corresponding user whether to accept the e-mail to be delivered from its e-mail addresser. In the case where the user does not accept the e-mail to be delivered, a notification unit sends a message for informing the addresser that there is no user having a public e-mail address. In the case where the conditions for delivering an e-mail are all satisfied, a delivery unit delivers the e-mail to a user having a public e-mail address.

13 Claims, 11 Drawing Sheets

302  FOR yuich@ mail.144.me.jp  301

| ADDRESSER E-MAIL ADDRESS | ACCEPT/NOT ACCEPT | 303 |
|---|---|---|
| akpat@mbn.or.jp | ACCEPT | |
| webmaster@mail.xxx.yyy.com | NOT ACCEPT | |
| ⋮ | ⋮ | |

```
To : yuich@mail.144.ne.jp
Subject :
From : admin@mail.144.ne.jp  ~~604
Dare : Mon, 21 Aug 2000 01:10:37 +0900 (JST)

DEAR YUICH:

FIRST E-MAIL FROM WEBMASTER@MAIL.XXX.YYY.COM

SUBJECT: FREE IMAGE!

DATE: AUG. 21, 2000  19:30

MESSAGE (HEADER PART):

YOU CAN DOWNLOAD FREE EXCITING IMAGE.
        JUST CLICK ON DOWNLOADING ICON IN
        WWW.XXX.YYY.COM

IF YOU ACCEPT THIS E-MAIL,

SEND E-MAIL INCLUDING FOLLOWING LINE,

TO ADMIN@MAIL.144.ne.jp accept webmaster@mail.xxx.yyy.com 20000821011037JST  ~~602

IF YOU DO NOT ACCEPT THIS E-MAIL, SEND E-MAIL INCLUDING FOLLOWING LINE,

TO admin@mail.144.ne.jp.

reject webmaster@mail.xxx.yyy.com 20000821011037JST  ~~603

PLEASE MAKE SURE THAT yuich@mail.144.ne.jp
    IS INPUT IN "FROM" (ADDRESSER NAME) PART OF REPLY E-MAIL admin@mail.144.ne.jp
```

To : admin@mail.144.ne.jp
Subject : Re : ACCEPT/NOT ACCEPT
From : yuich@mail.144.ne.jp
Dare : Mon, 21 Aug 2000 01:12:56 +0900 (JST)

> reject webmaster@mail.xxx.yyy.com 20000821011037JST ~603

| USER NAME | INFORMED-ADDRESSER ADDRESS | INDIVIDUAL E-MAIL ADDRESS |
|---|---|---|
| yuich | akpat@mbn.or.jp | 1234 |
| yuich | info@pat.yyy.com | 5216 |
| ogawa | yuich@cosat.com | 9238 |

SERVER DEVICE AND METHOD FOR PROVIDING E-MAIL SERVICE, AND INFORMATION RECORDING MEDIUM RECORDING A PROGRAM FOR REALIZING THE SERVICE

BACKGROUND OF THE INVENTION

1. Field of the Invention

The present invention relates to a server device and method for providing an e-mail transaction service, and an information recording medium storing a program for realizing the service.

Particularly, the present invention relates to a server device and method for preferably providing an e-mail service while preventing unwanted e-mails or junk e-mails (spam e-mails), and also a computer readable information recording medium recording a program for realizing the above service.

2. Description of the Related Art

Since the Internet has been in common use, the technique for exchanging e-mails between Internet users has been more important.

In the technique for exchanging e-mails, user information specifying the Internet users are managed by a corresponding e-mail server device. The e-mail server device transmits e-mails using an SMTP (Simple Mail Transfer Protocol).

Using the SMTP technique, once the e-mail server device receives an e-mail, the server device determines whether the addressee of the e-mail is a user's address managed by the server device itself. If so, the e-mail server device stores the e-mail in a spool area retained in the hard disk of the user.

The user retrieves and views e-mails addressed to himself/herself, by directly referring to the spool area or using a POP (Post Office Protocol) or IMAP (Internet Message Access Protocol) technique.

In the case where the addressee of the e-mail does not correspond to any users' addresses managed by the e-mail server device, the e-mail server device passes the e-mail to an e-mail server device managing the corresponding user's e-mail address, for example in a bucket-relay manner, using the SMTP technique, etc.

Along with the wide spread use of the WWW (World Wide Web) technique, it is more likely that users show their own e-mail address on business cards, or show it on their own personal Web site.

Thus shown e-mail address may often be searched using some kind of system. In this case, junk mails or any unwanted e-mails may automatically be sent to the searched e-mail address. Because such junk mails or the like are sent to the e-mail address, the user of the e-mail address may sometimes miss necessary e-mails, or it take quite a long time for retrieving e-mails.

The above problem may be preventable, if the user prepares different e-mail addresses to other users to be communicating with. Since e-mail users usually exchange e-mails with a large number of other users, the above method is so troublesome to prepare the plurality of e-mail addresses to other users, respectively.

There is a great demand for a technique for actively preventing unwanted e-mails.

SUMMARY OF THE INVENTION

The present invention has been made to overcome the above problem. It is accordingly an object of the present invention to provide a server device and method for providing an e-mail service while preventing unwanted e-mails, and a computer readable information recording medium which records a program for realizing the above.

In order to achieve the above object, according to the first aspect of the present invention, there is provided an e-mail server device which manages user information including at least one user, and delivers an e-mail to the at least one user specified in the user information, the device comprising:

a receiver which receives e-mails;

a transfer unit which transfers, in a case where an address of the received e-mail is an e-mail address of a user specified in user information managed by another e-mail server device, the received e-mail to the another e-mail server device;

an inquiry unit which inquires of the at least one user, in a case where the address of the received e-mail is a public e-mail address of the user specified in the user information managed by the e-mail server device, whether to accept the received e-mail to be delivered from its addresser;

a notification unit which notifies the addresser that there is no user having the public e-mail address, in a case where the at least one user does not accept the received e-mail to be delivered from the addresser as a result of the inquiry; and a delivery unit which delivers the received e-mail to the user having the public e-mail address, in a case where a delivery condition for delivering the e-mail is satisfied.

The e-mail server device of the present invention may further comprise an allowed-addresser recorder which records information representing the addresser of the received e-mail as an allowed addresser in association with the public e-mail address, in a case where the at least one user accepts the received e-mail to be delivered from the addresser as a result of the inquiry, and wherein the delivery condition is satisfied, in a case where the information representing the addresser of the received e-mail is recorded as the allowed addresser on the allowed-addresser recorder in association with a public e-mail address of the address of the e-mail.

The e-mail server device may further comprise:

an individual-address selector which selects an individual e-mail address managed by the e-mail address server, in association with the addresser of the e-mail and the user having the public e-mail address corresponding to the addressee of the received e-mail, in a case where the received e-mail is accepted to be delivered from the addresser as a result of the inquiry;

an individual address informer which informs the addresser of the e-mail about the selected individual e-mail address; and an individual address recorder which records information representing the user as a target user having the public e-mail address of the received e-mail and information representing the addresser as an informed-addresser, in association with the selected-individual e-mail address, and wherein the delivery condition is satisfied, in a case where the address of the received e-mail is the individual e-mail address recorded on the individual address recorder and information representing the addresser of the e-mail is recorded as an informed addresser, thereby the delivery unit delivers the e-mail to the user as the target user.

The individual address selector may selects, as an individual e-mail address, an e-mail address generated by converting characters of the public e-mail address of the received e-mail; and the original public e-mail address may be generated from the individual e-mail address as a resultant address of the character conversion, thereby achieving character reverse conversion of the individual e-mail address.

In the e-mail server device, a predetermined character string may be added in a user name of the public e-mail address, thereby achieving the character conversion of the public e-mail address.

The e-mail server device may further comprise a rewriting unit which rewrites the public e-mail address of the addresser specified in the e-mail into the individual e-mail address of the addresser recorded in association with the addresser and the addressee, in a case where rewriting conditions that (i) a public e-mail address of the user specified in the user information managed by the e-mail server device is specified as the addresser of the received e-mail, and that (ii) the individual address recorder records information representing the addressee of the received e-mail as an informed addresser and information representing the user having the public e-mail address as a target user, in association with a corresponding individual e-mail address, are satisfied, and wherein the transfer unit transfers an e-mail having the address rewritten by the rewriter instead of the received e-mail, in a case where the above rewriting conditions are satisfied.

According to the second aspect of the present invention, there is provided a method for providing an e-mail service for managing information regarding at least one user and his/her e-mail address and for sending e-mails to the at least one user, the method comprising the steps of:

receiving an e-mail;

transferring the received e-mail to another e-mail server device, in a case where an address of the received e-mail is not managed by the method for managing the e-mail service;

inquiring of the at least one user whether to accept the received e-mail to be delivered, in a case where the address of the received e-mail is a public e-mail address of the at least one user which is managed by the method for providing e-mail service;

informing, in a case where the received e-mail is not accepted to be delivered from an addresser of the e-mail as a result of inquiring of the user, the user that there is no user having the public e-mail address; and delivering the received e-mail to a user having the public e-mail address, in a case where a delivery condition for delivering the received e-mail is satisfied.

The method may further comprise the step of recording information representing the addresser of the received e-mail as an allowed addresser, in association with the public e-mail address, in a case where e-mails are accepted to be delivered from the addresser of the received e-mail as a result of the inquiry, and wherein the delivery condition is satisfied, in a case where information specifying the addresser of the received e-mail is recorded as an allowed addresser in association with the public e-mail address corresponding to the addressee of the received e-mail at the information recording step.

The method may further comprise the steps of:

selecting the individual e-mail address managed by the method for providing an e-mail service, in association with the user having the public e-mail address corresponding to the addressee of the received e-mail and with the addresser of the received e-mail, in a case where the received e-mail is accepted to be delivered from the addresser as a result of the inquiring;

informing the addresser of the received e-mail about the selected individual e-mail address; and recording information representing the user as a target user having the public e-mail address corresponding to the addressee of the received e-mail and information representing the addresser as an informed-addresser which is informed about the individual e-mail address, and wherein the delivery condition is satisfied, in a case where the addressee of the received e-mail is the individual e-mail address recorded at the individual address recording step and where information representing the addresser of the received e-mail is recorded as an informed-addresser, thereby the e-mail is delivered to the user specified as the target user in the recorded information at the delivering step.

In the method, a resultant address created by converting a character code of the public e-mail address corresponding to the addressee of the received e-mail may be selected as an individual e-mail address at the individual-address selecting step; and the original public e-mail address may be generated from the individual e-mail address as a resultant address of the character conversion, thereby achieving character reverse conversion of the individual e-mail address.

In the method, the character conversion may be so performed that a resultant address including a predetermined character string in a user name of the public e-mail address is obtained.

The method may further comprise the step of rewriting the public e-mail address of the addresser specified in the e-mail into the individual e-mail address of the addresser recorded in association with the addresser and the addressee, in a case where rewriting conditions that (i) a public e-mail address of the user specified in the user information managed by the method is specified as the addresser of the received e-mail, and that (ii) information representing the addressee of the received e-mail as an informed addresser and information representing the user having the public e-mail address as a target user are recorded at the individual-address recording step, in association with a corresponding individual e-mail address, are satisfied, and wherein an e-mail having the address rewritten by the rewriter instead of the received e-mail is transferred at the transferring step, in a case where the above rewriting conditions are satisfied.

A program for controlling a computer to function as the above e-mail server device may be recorded on a computer readable information recording medium, such as a computer disk, a floppy disk, a hard disk, a magneto-optical disk, a digital video disk, a magnetic tape, a semiconductor memory, etc.

A program recorded on the information recording medium of the present invention may be executed by an information processor, such as a general-purpose computer, a parallel calculator, and the like including a memory unit, a calculator, an output device, etc., thereby achieving the above e-mail server device and the method for providing e-mail service.

With or without an information processor, the information recording medium recording the program of the present invention may be distributed and sold.

BRIEF DESCRIPTION OF THE DRAWINGS

The object and other objects and advantages of the present invention will become more apparent upon reading of the following detailed description and the accompanying drawings in which.

DETAILED DESCRIPTION OF THE PREFERRED EMBODIMENTS

First Embodiment

Figure 1:
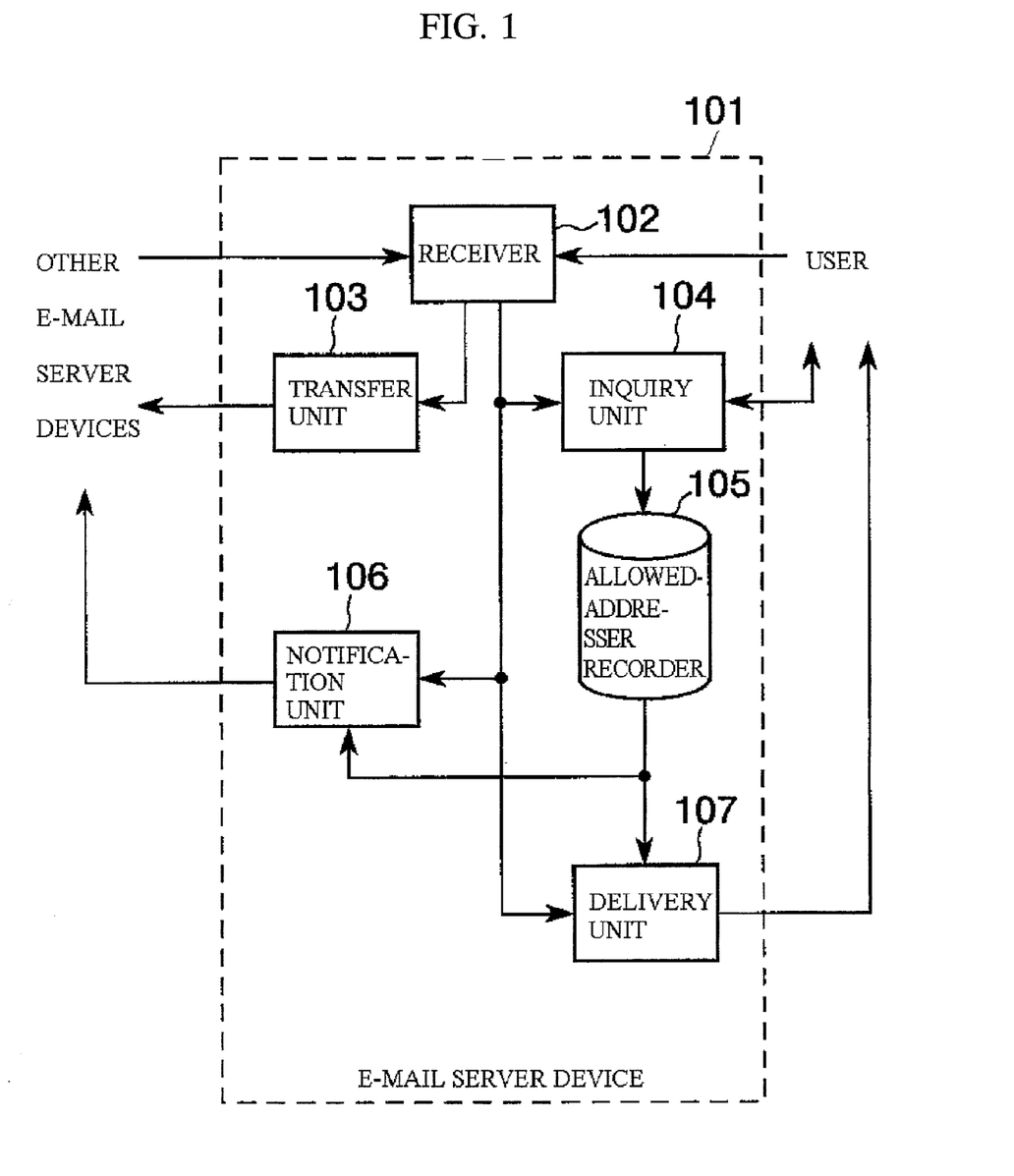
FIG. 1 is an exemplary diagram showing the schematic structure of an e-mail server device according to the first embodiment of the present invention.

FIG. 1 is an exemplary diagram showing the schematic structure of an e-mail server device according to the first embodiment of the present invention. The e-mail server device of this embodiment will now be described with reference to the accompanying drawings.

An e-mail server device 101 manages user information specifying users and their e-mail addresses, and send e-mails to the users. In other words, the e-mail server device 101 serves as an SMTP server, POP server, IMAP server, or the like.

In general, each of the e-mail addresses managed by the e-mail server device 101 includes a name identifying a corresponding user, followed by an at-mark (@), and a domain name of the e-mail server device 101. For example, in the case where the domain name of the e-mail server device 101 is "mail.144.ne.jp" and the user name is "yuich", the e-mail address would be "yuich@mail.144.ne.jp". In this embodiment, such an e-mail address is called a "public e-mail address".

The e-mail server device 101 according to this embodiment comprises a receiver 102, a transfer unit 103, an inquiry unit 104, an allowed-addresser recorder 105, a unit 106, and a delivery unit 107, etc.

The receiver 102 receives e-mails from users.

In the case where a target e-mail address of the received e-mail is an e-mail address of a user specified in user information managed by another e-mail server device, the transfer unit 103 transfers the received e-mail to the another e-mail server device. This realizes an e-mail relay service using the SMTP (Simple Mail Transfer Protocol) protocol.

An e-mail address specified in the field of "To:" of an received e-mail is called as a "target address" or an "addressee's address". An e-mail address specified in the field of "From:" or "Sender:" of a received e-mail is called as a "source address" or an "addresser's address".

In the case where the target address of the received e-mail is a public e-mail address of a user specified in the information managed by the e-mail server device 101, the inquiry unit 104 inquires of the user whether to accept the e-mail to be delivered from the addresser of the received e-mail.

In this embodiment, there is employed a method for inquiring of the allowed-addresser recorder 105 whether to accept e-mail to be delivered. In this embodiment, there may also be employed an inquiry method using general e-mail software (so-called a "mailer").

In this embodiment, provided to the user is a "Web mail" service for viewing e-mails by referring to a WWW page.

Figure 2:
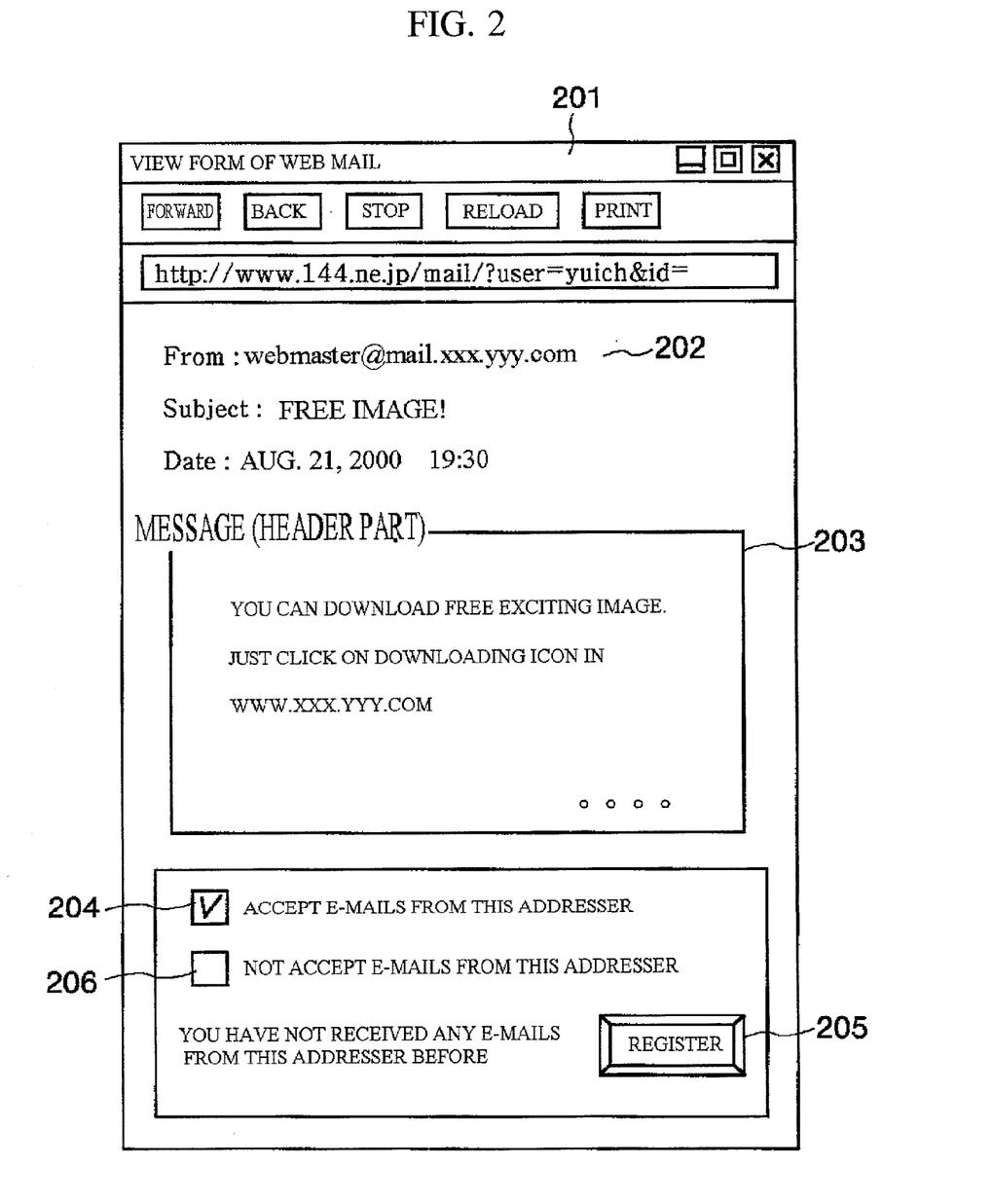
FIG. 2 is a diagram exemplarily showing a WWW browser for showing a view format for displaying an e-mail.

A Web mail is displayed, after the message of the e-mail is displayed, in a Web mail format including check boxes through which the user can indicate his/her intention whether to accept e-mails from the same addresser in the future. FIG. 2 shows such a Web mail format for showing the e-mail, displayed on a WWW browser.

A view format 201 includes an e-mail address 202 of the addresser of the e-mail, a header part 203 of the message included in the e-mail, and a check box 204 for inputting the user's intention to accept e-mails from the same e-mail address 202. In the case where the user intends to accept e-mails from the e-mail address 202, he/she checks the check box 204, and clicks on a "Register" button 205. In the case where the user intends to reject e-mails from the e-mail address 202, he/she selects a check box 206, and clicks on the "Register" button 205.

Figure 3:
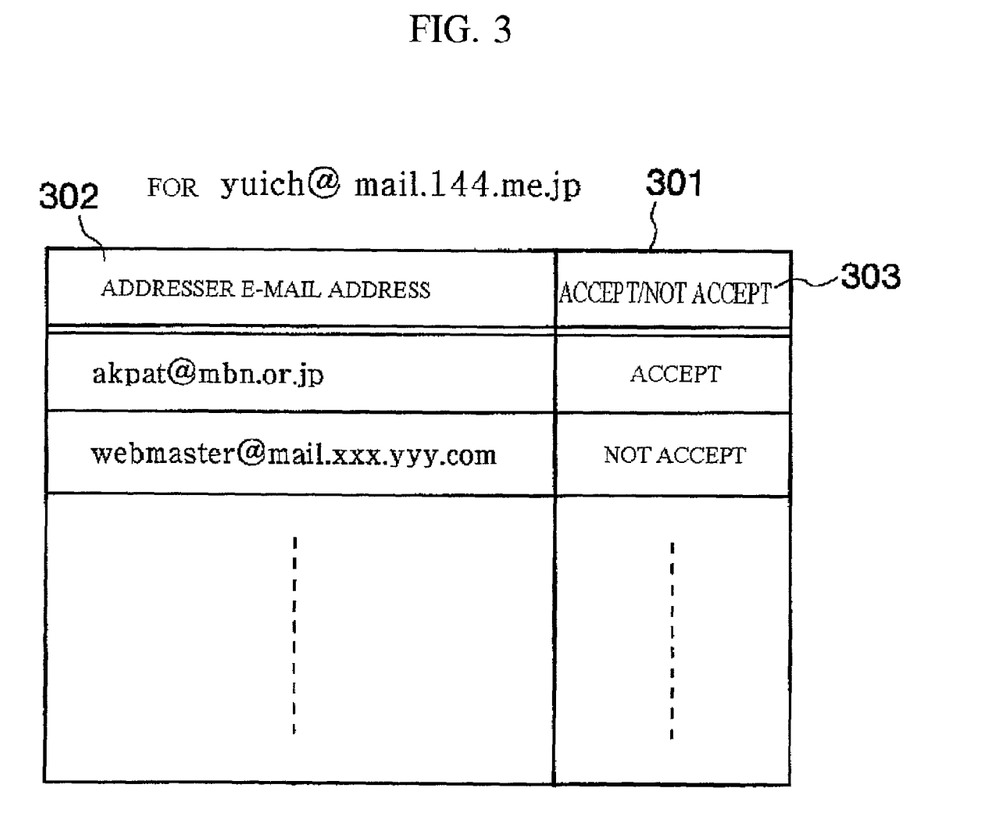
FIG. 3 is an exemplary diagram showing information recorded on an allowed-addresser recorder, in association with one user.

Upon clicking on the "Register" button 205, the allowed-addresser recorder 105 records information representing whether e-mails from the addresser having sent the above e-mail are accepted to be delivered. FIG. 3 is an exemplary diagram showing such information recorded in the allowed-addresser recorder 105.

The allowed-addresser recorder 105 stores information in the form of a table 301. The table 301 is composed of a field of "e-mail address" 302 including columns for storing e-mail addresses of e-mail addressers, and a field of "indication information" 303 including columns, in association with the respective columns 302, for storing the information representing whether to accept e-mails from a corresponding e-mail addresser.

In the case where the allowed-addresser recorder 105 records information representing that e-mails from the addresser having sent the server-received e-mail are not accepted to be delivered, the notification unit 106 informs the addresser that there is no user having a corresponding public e-mail address.

For example, if an e-mail sent from the addresser is a junk (unwanted) e-mail, the addressee of the e-mail may reject to receive the e-mail. In this case, a message of "unknown user" is sent to the SMTP server of the corresponding e-mail addresser. By so doing, the e-mail address of the addressee is struck off from a list of e-mail addresses which the e-mail addresser has. Then, it can be expected that the junk e-mail from the same addresser will not be sent to the addressee.

In the case where information representing that e-mails from a particular addresser are not accepted to be delivered is registered in the allowed-addresser recorder 105, i.e.

where all delivery conditions are satisfied, the delivery unit 107 delivers a received e-mail to a user having a public e-mail address.

In the case where the e-mail server device 101 has what is so-called a P.O. BOX service, it forwards the e-mail to an address of the user having the public e-mail address.

Figure 4:
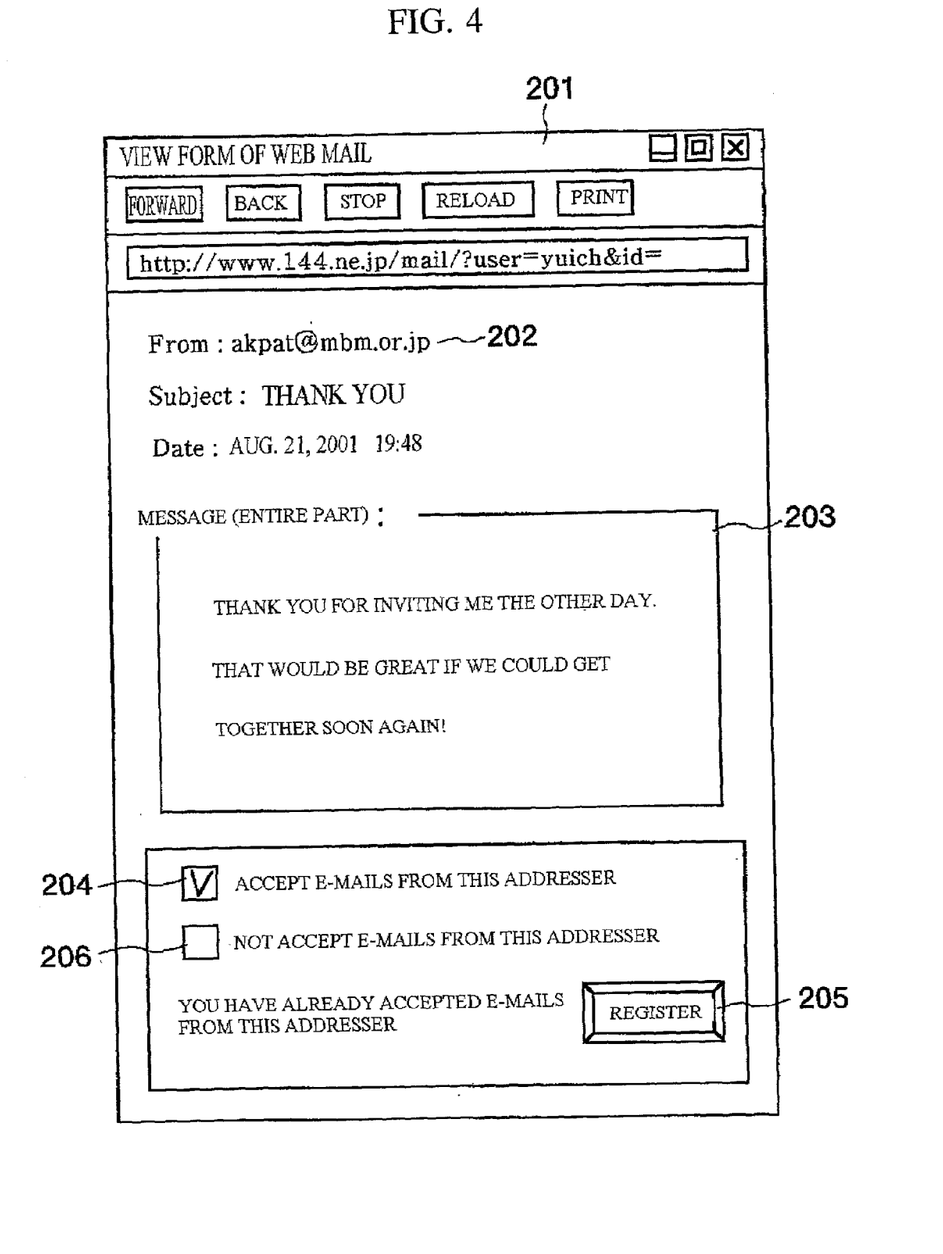
FIG. 4 is a diagram showing a view form for displaying an e-mail to be displayed by a WWW browser.

FIG. 4 exemplarily shows a view form which is displayed in the case where an addresser of an e-mail is recorded as an allowed addresser in the allowed-addresser recorder 105. This view form will now specifically be described with reference to FIG. 4.

As shown in FIG. 2, in the case where an e-mail is sent from a new addresser, only the header part in the message of the e-mail is displayed, and the addressee of this e-mail is asked whether to accept the e-mail to be delivered. However, in the case where an e-mail is sent from an allowed addresser, the entire message of the e-mail is displayed as shown in FIG. 4.

The addressee of the e-mail may select the check box 206, and click on the "Register" button 205, thereby rejecting e-mails from the corresponding e-mail addresser.

Figure 5:
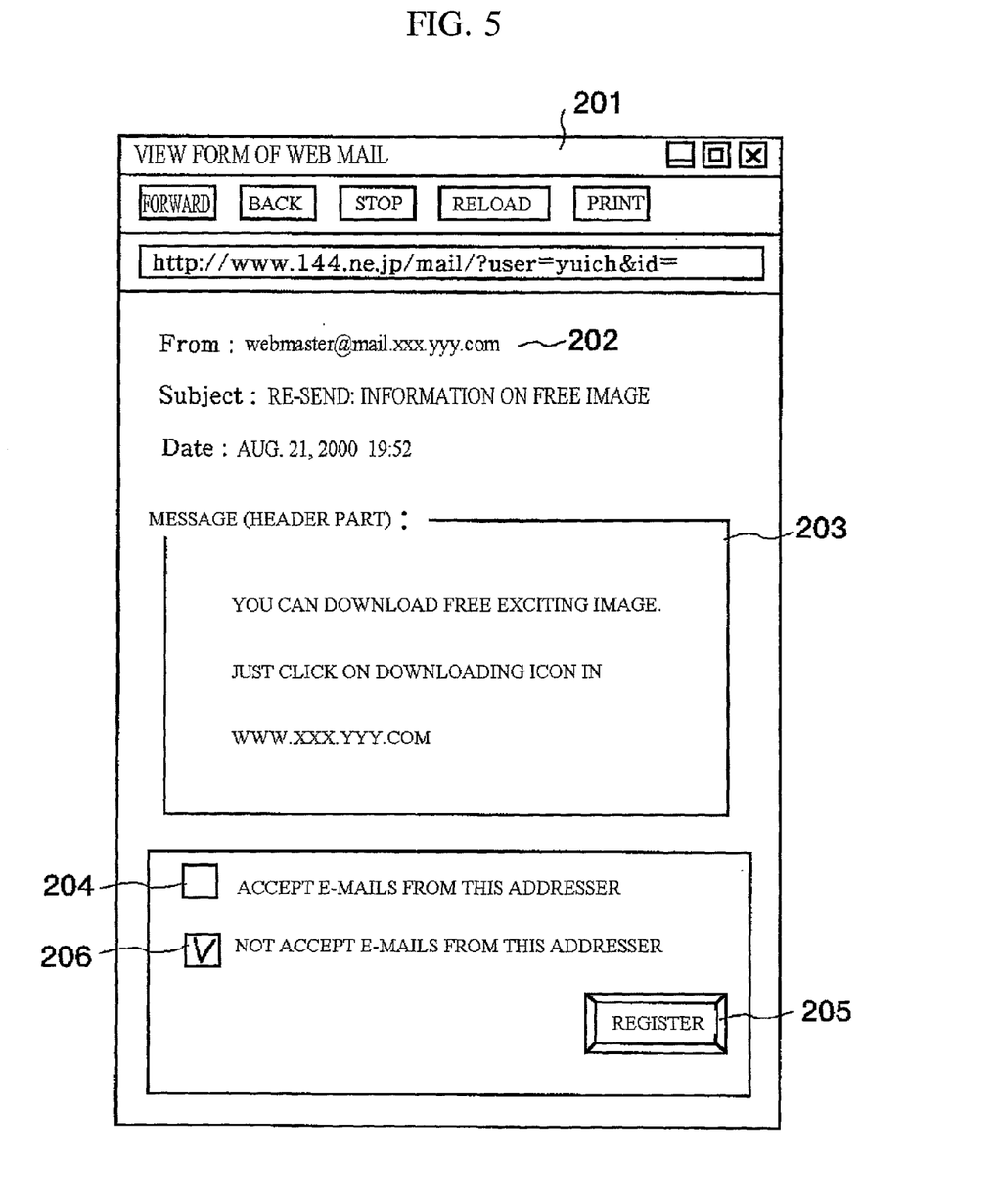
FIG. 5 is a diagram showing a view form for displaying an e-mail to be displayed by a WWW browser.

FIG. 5 exemplarily shows a view form which is displayed in the case where an addresser of an e-mail is recorded as a not-allowed addresser. This view form will specifically be described with reference to FIG. 5.

FIG. 5 shows an example of a view form displayed by a WWW browser in the case where the allowed-addresser recorder 105 records information representing that e-mails from the addresser are not accepted to be delivered. This view form is displayed in the case where the e-mail has been transmitted again from the e-mail addresser having previously sent an unwanted e-mail.

In this case, likewise the view form of FIG. 2, only the header part 203 included in the message of the e-mail is displayed, the user can think over whether to accept e-mails from the corresponding addresser. If the e-mail is again an unwanted e-mail, the user rejects such an e-mail to be delivered, thereby reducing the amount of data communications.

In this embodiment, the information representing whether the user accepts e-mails from a particular addresser is registered in the e-mail server device 101 using the view form displaying the Web e-mail. However, the information may be registered in any other method. For example, the user may receive an inquiry e-mail, and the user sends a response e-mail including information representing whether the user accepts e-mails from a particular addresser, to the inquiry e-mail to the server device 101, thereby registering the information in the allowed-addresser recorder 105.

Figure 6:
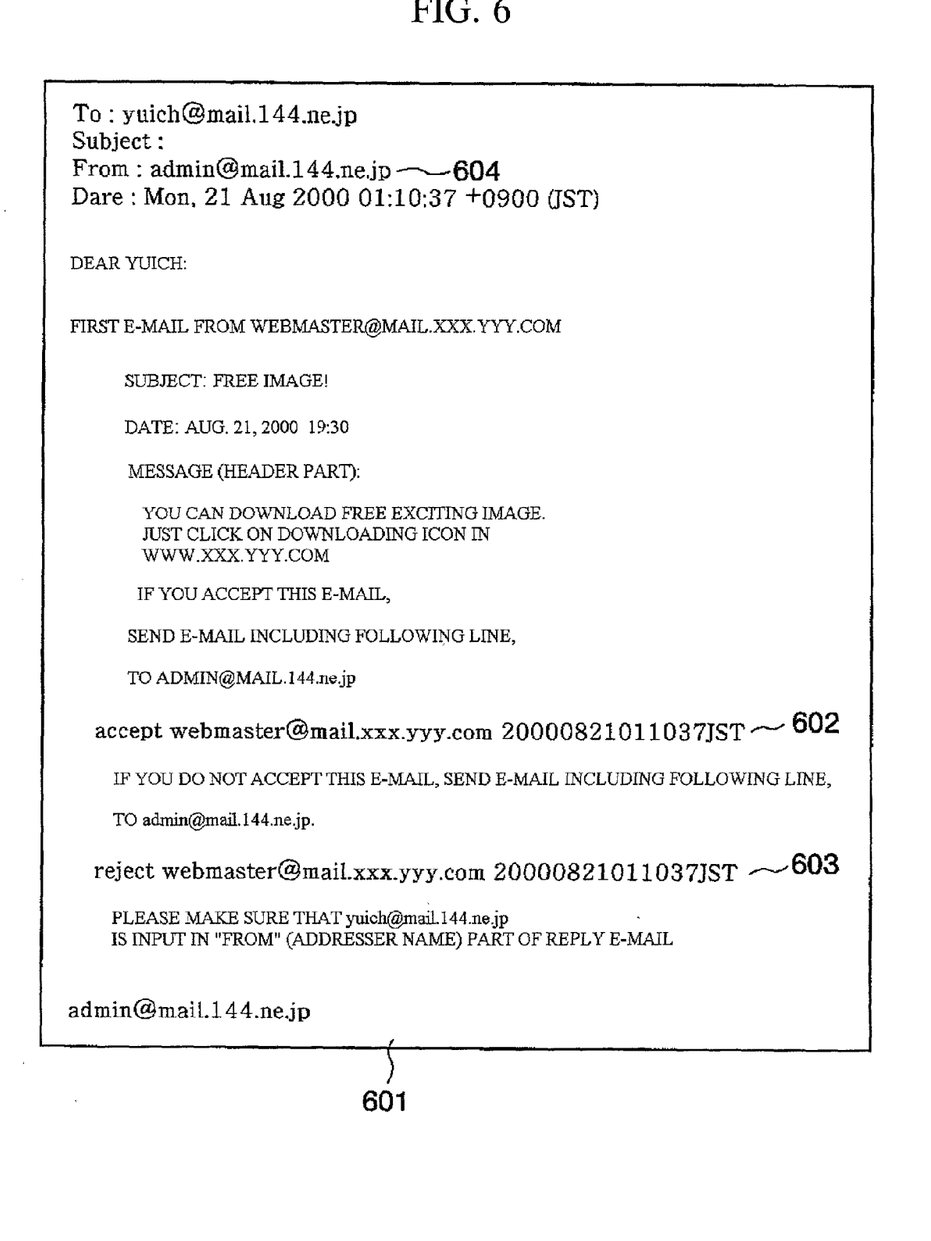
FIG. 6 is an explanatory diagram showing an inquiry e-mail.

FIG. 6 illustrates such an inquiry e-mail. As shown in this e-mail 601, if the user accepts e-mails from the corresponding addresser, he/she sends a response e-mail including a line 602 representing the user's intention to the e-mail server device 101. On the contrary, if the user does not accept e-mails from the corresponding addresser, he/she sends a response e-mail including a line 603 representing the user's intention to the e-mail server device 101.

To facilitate the delivery of the response e-mail, the e-mail address of the addresser of the inquiry e-mail is an administration e-mail address 604 of the e-mail server device 101.

Figure 7:
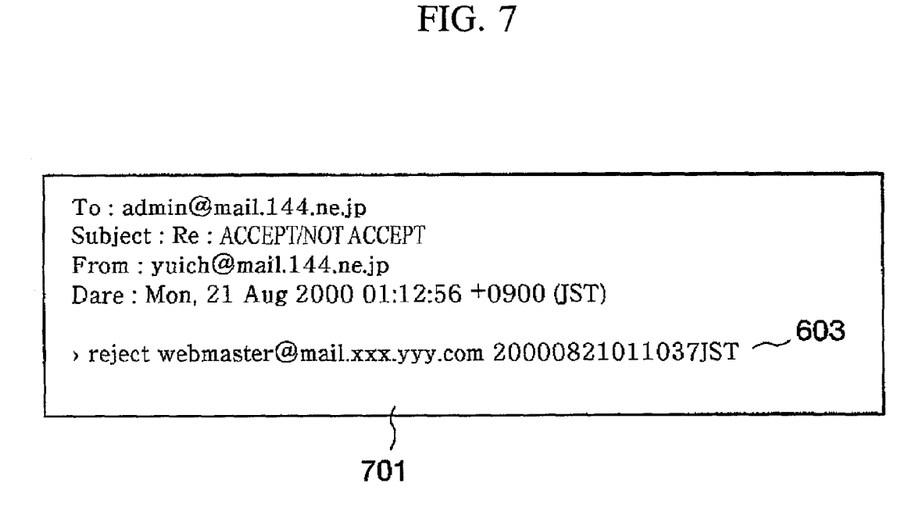
FIG. 7 is an explanatory diagram showing a reply e-mail.

FIG. 7 shows an example of a response e-mail 701 including the line 604 representing that the user does not accept e-mails from the corresponding addresser. On the first line of the response e-mail 701, the line 603 is included.

In addition, there may be employed another method for registering the user's intention of whether to accept e-mails from the corresponding addresser, using a command system to be provided through a mailing list.

Second Embodiment

In the above first embodiment, the user is given only one e-mail address. In this embodiment, in addition to an e-mail address to be public (a public e-mail address), individual e-mail addresses are employed.

Figure 8:
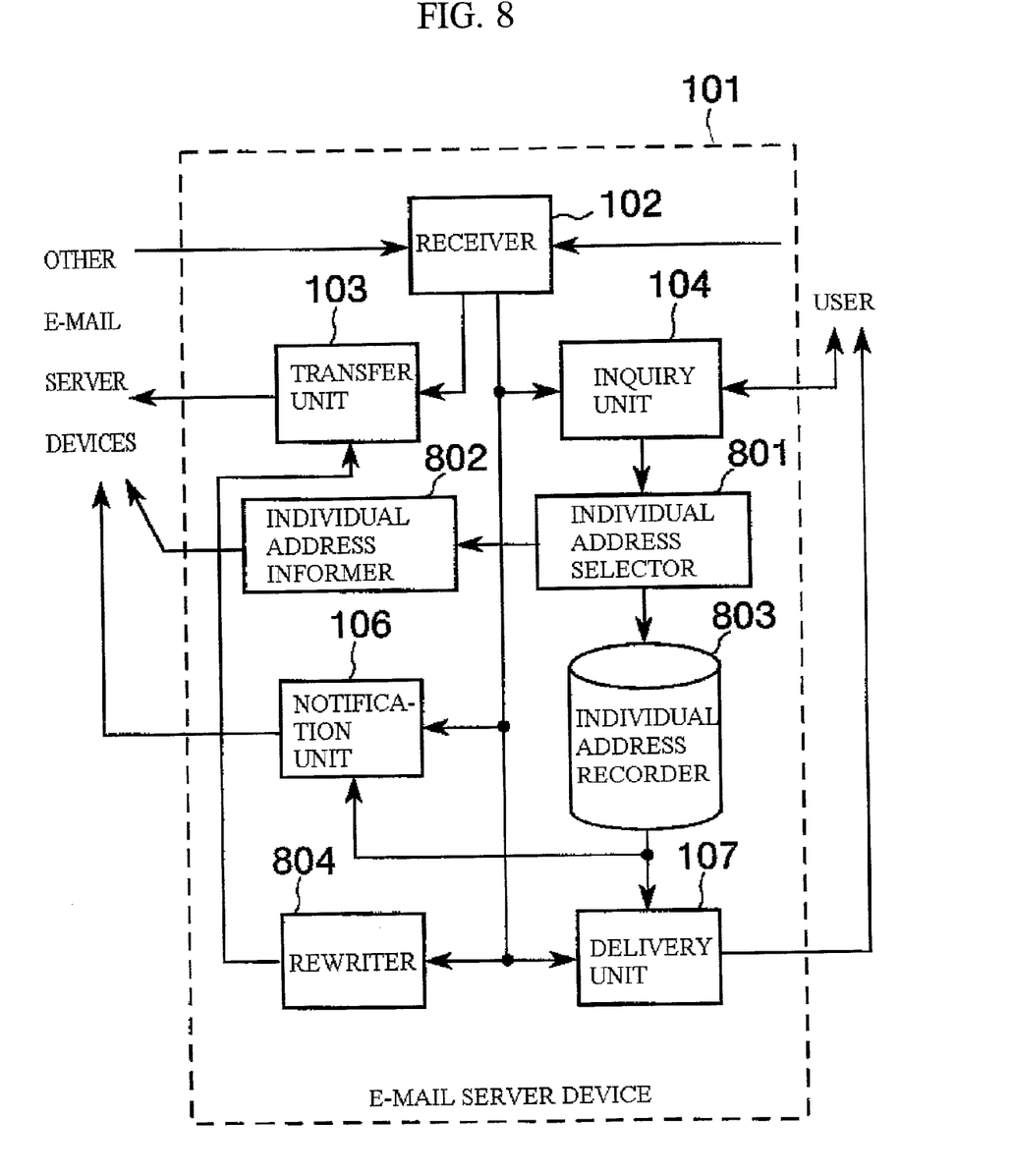
FIG. 8 is an exemplary diagram showing the schematic diagram of an e-mail server device according to the second embodiment of the present invention.

FIG. 8 is an exemplary diagram showing the schematic structure of the e-mail server device 101 according to this embodiment.

In this embodiment, the e-mail server device 101 includes, in place of the allowed-addresser recorder 105, an individual address selector 801, an individual address informer 802, and an individual address recorder 803. Additionally, the e-mail server device 101 may include a rewriter 804.

As a result of inquiry, in the case where the user accepts e-mails from an addresser having sent a server-received e-mail, the individual address selector 801 selects individual e-mails managed by the e-mail server device 101 and corresponding to the user having a public e-mail address in the addressee of the server-received e-mail address and to the addresser of the e-mail.

For example, in the case where the public e-mail address is "yuich@mail.144.ne.jp", an individual e-mail address is obtained from the above public e-mail address by converting the characters included therein. This conversion of the characters should be performed in such a way that the converted individual e-mail address can easily be reverse-converted back to its original public e-mail address.

For example, in front of the user name of a corresponding e-mail address, some numerals and a dot may be added, so as to achieve the character conversion of the public e-mail address. According to this example, resultant individual e-mail addresses may, for example, be "1234.yuich@mail.144.ne.jp", "9876.yuich@mail.144.ne.jp" or the like.

A unique individual e-mail address is selected and given to the addresser to be sending e-mails accepted by the target addressee. Thus selected individual e-mail address is sent to the e-mail addresser by the individual address informer 802.

Recorded in the individual address recorder 803 is information representing: a target user having the public e-mail address corresponding to the addressee of the received e-mail; and an informed addresser to whom the individual e-mail address is sent, in association with the informed individual e-mail address.

Figure 9:
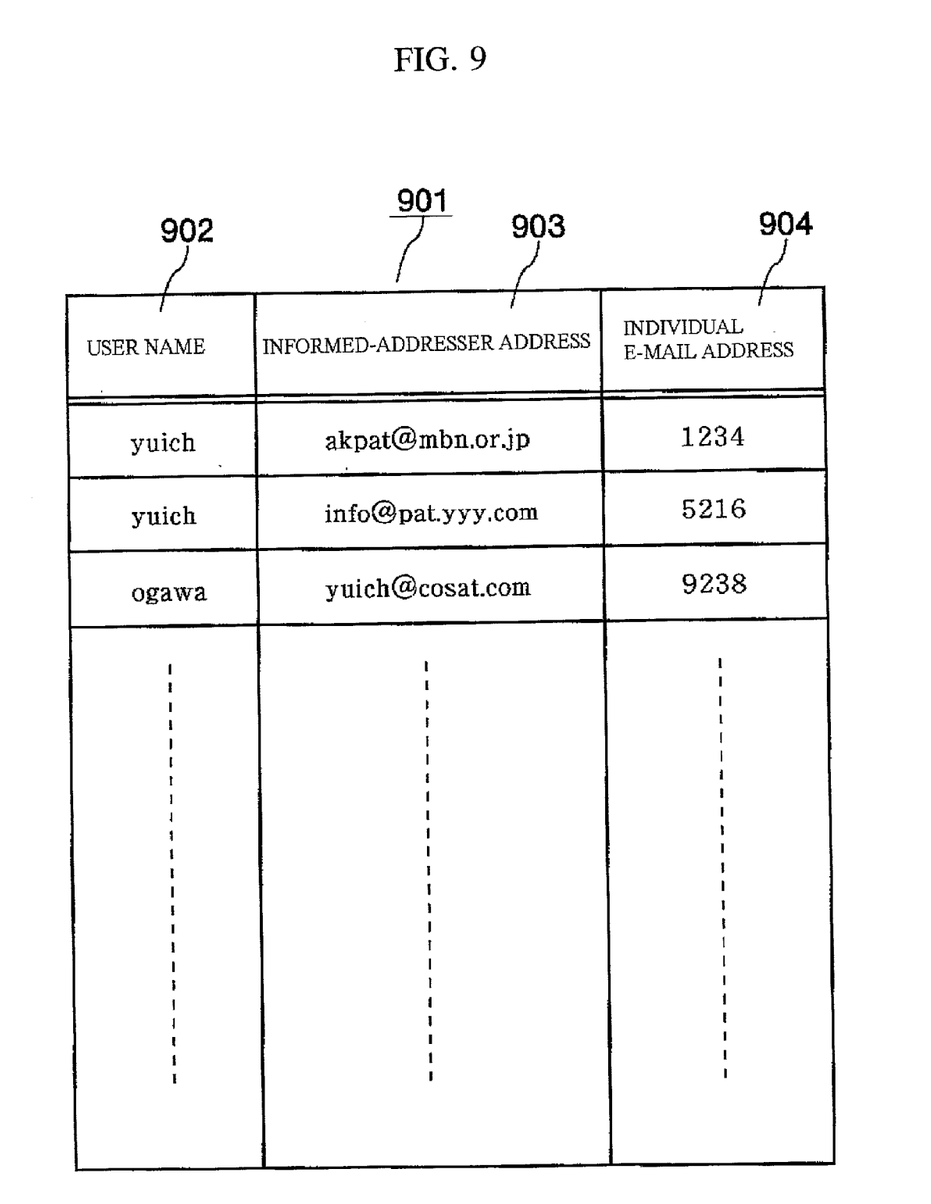
FIG. 9 is an exemplary diagram showing information recorded in an individual address recorder.

FIG. 9 is an exemplary diagram showing the information recorded in the individual e-mail address recorder 803. Unlike the case of FIG. 3, as illustrated in FIG. 9, information regarding a plurality of users specified in information managed by the e-mail server device 101 is recorded in the individual e-mail address recorder 803.

The individual address recorder 803 records the information in the form of a table 901. The table 901 stores: a column 902 of user names managed by the e-mail server device 101; a column 903 of e-mail addresses of addressers (informed addressers) to be sending e-mails accepted by the respective users; and a column 904 for recording prefixes (sets of numbers) of the individual e-mail addresses which are affixed to the addresses of the e-mail addressers.

As seen from FIG. 9, the table 901 stores the e-mail address "akpat@mbn.or.jp" of the allowed addresser to be sending e-mails to the user "yuich" specified in information managed by the e-mail server device 101 (mail.144.ne.jp), and its individual e-mail address is "1234.yuich@mail.144.ne.jp".

Instead of recording the prefixes (such as "1234", etc.), the table 901 may store the entire individual e-mail addresses, such as "1234.yuich@mail. 144.ne.jp", and the like.

Instead of recording the user names, such as "yuich" and the like, the table 901 may store the public e-mail address (yuich@mail.144.ne.jp) of the user or a user ID of the user.

In the case where the addressee of the received e-mail is the individual e-mail address recorded in the individual address recorder 803 and where the addresser of the e-mail is recorded as the informed addresser, the delivery conditions for delivering the e-mail are satisfied. In the case where the delivery conditions are satisfied, the delivery unit 107 delivers the e-mail address to the user registered as the target user.

In the above example, if the user "akpat@mbn.or.jp" sends an e-mail addressed to "1234.yuich@144.ne", the delivery conditions are satisfied. Hence, the e-mail server device 101 (mail.144.ne.jp) delivers the message contents of the e-mail to the user "yuich".

The individual e-mail is not delivered to a user having sent an unwanted e-mail to an addressee. An e-mail including an message representing that the corresponding user is unknown is sent to the user having sent the unwanted e-mail to the addressee. Hence, even if the public e-mail address appears on a business card or Web page, it is preventable that the corresponding user receives the unwanted e-mails as much as possible.

In the above embodiment, in place of the message of "unknown user", there may be employed other messages, such as "User has rejected to receive your e-mail", "Speak to may secretary first, please, or send an e-mail to my secretary to aaa@hhh.ne.jp", "Your e-mail address is not valid any more".

Figure 10:
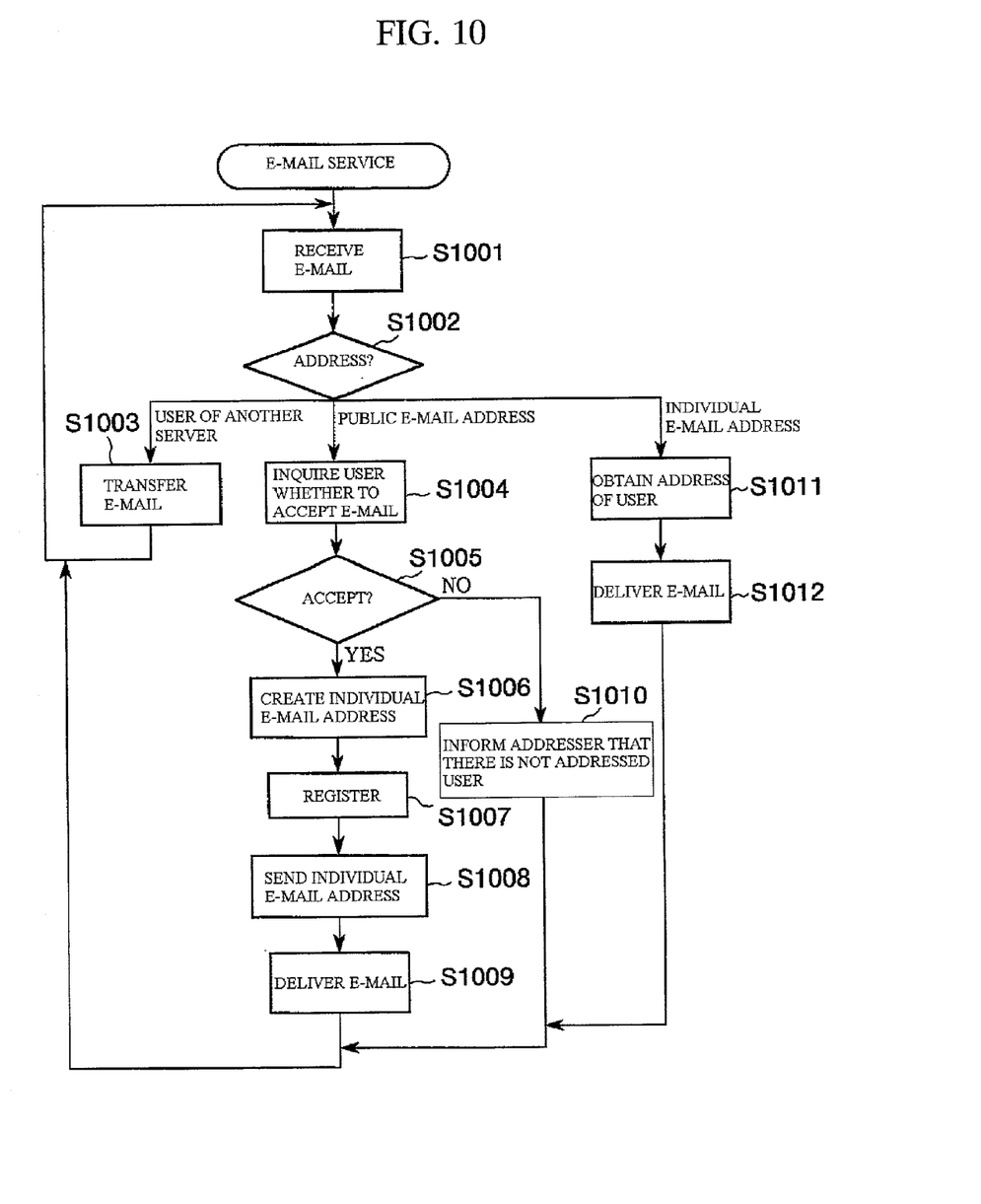
FIG. 10 is a flowchart schematically showing procedures included in a process for providing an e-mail service which is carried out by the sever device of FIG. 8.

FIG. 10 is a flowchart schematically showing the procedures included in a process for providing an e-mail service, according to the second embodiment of the present invention.

Upon reception of a packet of an e-mail (Step S1001), the e-mail server device 101 checks the address of the e-mail (Step S1002). In the case where the addressee corresponds to a user specified in information managed by another e-mail server device 101 (Step S1002; user of another server), the e-mail server device 101 transfers the received packet to the another server device 101 (Step S1003), and the flow returns to the procedure of the step S1001.

On the other hand, in the case where the addressee corresponds to a user specified in information managed by the e-mail server device 101 itself (Step S1002; public e-mail address), the e-mail server device 101 inquires of the user whether to accept the e-mail to be sent from the corresponding e-mail addresser (Step S1004). This can be achieved using the above-described Web mail or a command e-mail message, using a mailing list, etc. At that time the e-mail server device 101 inquires of the user, the e-mail server device 101 may attach a part of the message included in the e-mail sent from the corresponding addresser to another e-mail for inquiring of the user whether to accept the e-mail to be delivered. Then, the user can decide whether to accept the e-mail to be delivered under the consideration of the part of the message.

In the case where the user accepts the e-mail (Step S1005; Yes), the e-mail server device 101 creates an individual e-mail address to be given to the addresser (Step S1006), and registers the user of the addressee, the e-mail address of the addresser, and the individual e-mail address (or a prefix thereof) (Step S1007).

After this, the e-mail server device 101 informs the addresser of the created individual e-mail address (Step S1008).

Finally, the e-mail server device 101 sends the entire message of the e-mail to the addressed user (Step S1009), and the flow returns to the step S1001.

In the case where the user does not accept the e-mail (Step S1005; No), the e-mail server device 101 sends an e-mail including a message "there is no addressed user" to the e-mail addresser (Step S1010), and the flow returns to the step S1001.

In the case where the addressed e-mail address is the individual e-mail address of a user specified in information managed by the e-mail server device 101 itself (Step S1001; individual e-mail address), the e-mail server device 101 obtains an address of the user from the individual e-mail address (Step S1011), sends the e-mail to the user (Step S1012), and the flow returns to the step S1001.

In this embodiment, the e-mail server device 101 may includes the rewriter 804, as shown in FIG. 8. The rewriter 804 works in the case where the user having an e-mail address managed by the e-mail server device 101 is to send an e-mail to an external address using the SMTP system of the e-mail server device 101.

Generally, e-mail users perform reading and writing of e-mails using software, so-called a "mailer". In most mailers, each user can set only a few e-mail addresses in the field of "From" in e-mails.

In this embodiment, an individual e-mail address is uniquely assigned to each user.

When to send an e-mail to the user who is given the individual e-mail address, the rewriter 804 functions so as to reduce the load of both users.

The rewriter 804 rewrites an address of an e-mail received by the receiver 102 into an individual e-mail address corresponding to a recorded addresser of the e-mail, in the case where the following conditions for rewriting are satisfied.

(i) The e-mail address of the addresser having sent the received e-mail is a public e-mail address of a user which is managed by the e-mail server device 101.

(ii) The individual address recorder 803 records the addressee of the corresponding e-mail as an informed-addresser and the user having the public e-mail address as a target user, in association with an individual e-mail address.

The transfer unit 103 transfers a rewritten e-mail, instead of the received e-mail, in the case where the conditions for rewriting are all satisfied.

For the sake of simplicity, an example of the rewriting of an e-mail will now be explained. Let it be assumed that the user "yuich" uses the e-mail server device 101 (mail.144.ne.jp) to send an e-mail addressed to "akpat@mbn.or.jp". Likewise the above examples, the individual e-mail address "1233.yuich@mail.144.ne.jp" corresponding to the user "yuich" and the e-mail address "akpat@mbn.or.jp" is registered.

In the case where the e-mail address of "akpat@mbn.or.jp" is written in the addressee field ("To") of the e-mail created by the user "yuich" and where the e-mail address of "yuich@mail.144.ne.jp" is written in the addresser field ("From"), the conditions for rewriting the e-mail are satisfied. Hence, the rewriter 804 rewrites the addresser field (From) to "1234.yuich@mail.144.ne.jp", and the transfer unit 103 transfers the rewritten e-mail to "akpat@mbn.or.jp".

The rewriting process is thus performed. Thus, the user "yuich" having the e-mail address of "yuich@mail.144.ne.jp" needs to set only his/her public e-mail address onto the mailer software.

The user of "akpat@mbn.or.jp" needs not refer to his/her address book included in the mailer software, and just simply operates a predetermined button for creating a reply e-mail for replaying to the received e-mail, thereby preparing the replay address of "1234.yuich@mail. 144.ne.jp".

Schematic Structure of Computer

Figure 11:
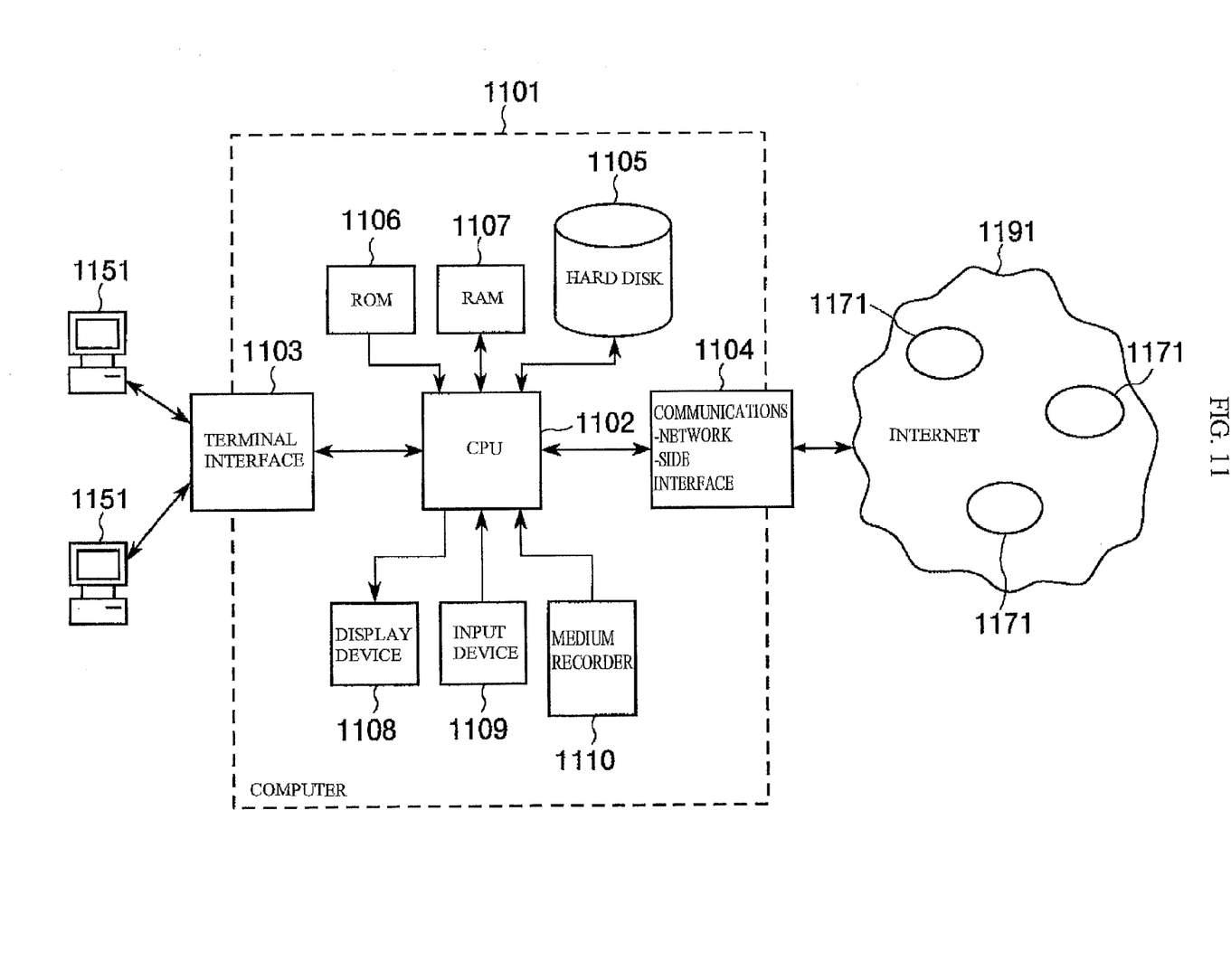
FIG. 11 is an exemplary diagram showing the schematic structure of a computer which serves as an e-mail server device of the present invention.

FIG. 11 is an exemplary diagram showing the typical schematic structure of a computer which serves as the e-mail server device 101 of the present invention.

Each unit of a computer 1101 is controlled by a CPU 1102. Each user terminal 1151 sends a connection request to a terminal-side interface 1103 through a telephone line, etc. The CPU 1102 performs data communications with the terminal 1151 through the terminal-side interface 1103. As illustrated in FIG. 11, one or more than one terminal 1151 may be included. The terminal-side interface 1103 may be a modem, terminal adapter, or the like.

Other devices 1171 (other e-mail server devices, etc.) connected onto the Internet 1191 performs data communications with the CPU 1102 through a communications-network-side interface 1104. The communications-network-side interface 1104 may be any one various types of network interface cards, modem, or a terminal adapter.

Upon reception of a connection request from the terminal 1151, the CPU 1102 dynamically assigns the requested terminal 1151 an IP address. At this time, the CPU 1102 uniquely selects an IP address from one or a plurality of IP addresses which are recorded in advance on a hard disk 1105, and assigns the uniquely selected IP address to the terminal 1151. This is so-called a DHCP (Dynamic Host Configuration Protocol) service.

Upon activation of the computer 1101, the CPU 1102 executes an IPL (Initial Program Loader) program recorded in a ROM (Read Only Memory) 1106. Included in the IPL program is an instruction for retrieving a program recorded in a predetermined location of the hard disk 1105 into a RAM (Random Access Memory) 1107 and for executing this retrieved program. Upon execution of this instruction, the OS (Operating System), a program for controlling the computer 1101 to function as a gateway for ISP (Internet Service Provider), etc. run on the computer 1101.

When the CPU 1102 relays a message to/from the terminal 1151, it uses the RAM 1107 as a buffer temporarily storing the message.

Additionally, the computer 1101 may include a display device 1108, such as a CRT (Cathode Ray Tube) display, etc., and an input device 1109, such as a keyboard, a mouse, etc. The administrator of the relay controls or designs the computer 1101 using the display device and the input device, etc.

The computer 1101 may include a medium recorder 1110, such as a CD-ROM (Compact Disk ROM) drive, FD (Floppy Disk) drive, etc., for installing a program in the computer 1101. In this case, the program can be installed from the CD-ROM or FD drive into the hard disk 1105. A program recorded in any one of the devices 1171 connected onto the Internet 1191 can also be installed into the hard disk 1105.

Various embodiments and changes may be made thereonto without departing from the broad spirit and scope of the invention. The above-described embodiments are intended to illustrate the present invention, not to limit the scope of the present invention. The scope of the present invention is shown by the attached claims rather than the embodiments. Various modifications made within the meaning of an equivalent of the claims of the invention and within the claims are to be regarded to be in the scope of the present invention.

This application is based on Japanese Patent Application No. 2000-254203 filed on Aug., 24, 2000 and including specification, claims, drawings and summary. The disclosure of the above Japanese Patent Application is incorporated herein by reference in its entirety.

What is claimed is:

1. An e-mail server device which manages user information including at least one user, the user information specifying an e-mail address as a public e-mail address owned by the at least one user and another e-mail address as an individual e-mail address owned by the at least one user, and delivers an e-mail to the at least one user specified in the user information, said device comprising:

a receiver which receives e-mails;

a transfer unit which transfers, in a case where an address of the received e-mail is not managed by the e-mail server device but it managed by another e-mail server device, the received e-mail to the another e-mail server device;

an inquiry unit which inquires of the at least one user, in a case where the address of the received e-mail is the public e-mail address owned by the user specified in the user information managed by the e-mail server device, whether to accept the received e-mail to be delivered from its addresser;

a notification unit which notifies the addresser of the received e-mail that there is no user owning the address of the received e-mail, in a case where the at least one user does not accept the received e-mail to be delivered from the addresser as a result of the inquiry;

a delivery unit which delivers the received e-mail to the user owning the public e-mail address, in a case where a delivery condition for delivering the e-mail is satisfied;

an individual-address selector which selects an individual e-mail address managed by said e-mail address server, in association with the addresser of the e-mail and the user owning the public e-mail address corresponding to the addressee of the received e-mail, in a case where the received e-mail is accepted to be delivered from the addresser as a result of the inquiry;

an individual address informer which informs the addresser of the e-mail about the selected individual e-mail address; and an individual address recorder which records information representing the user as a target user owning the public e-mail address of the received e-mail and information representing the addresser as an informed-addresser, in association with the selected-individual e-mail address, and wherein the delivery condition is satisfied, in a case where the address of the received e-mail is the individual e-mail address recorded on said individual address recorder and information representing the addresser of the e-mail is recorded as an informed addresser, thereby the delivery unit delivers the e-mail to the user as the target user.

2. The e-mail server device according to claim 1, further comprising an allowed-addresser recorder which records information representing the addresser of the received e-mail as an allowed addresser in association with the public e-mail address, in a case where the at least one user accepts the received e-mail to be delivered from the addresser as a result of the inquiry, and wherein the delivery condition is satisfied, in a case where the information representing the addresser of the received e-mail is recorded as the allowed addresser on said allowed-addresser recorder in association with a public e-mail address of the address of the e-mail.

3. The e-mail server device according to claim 1, wherein:

said individual address selector selects, as an individual e-mail address, an e-mail address generated by converting characters of the public e-mail address of the received email; and the original public e-mail address is generated from the individual e-mail address as a resultant address of the character conversion, thereby achieving character reverse conversion of the individual e-mail address.

4. The e-mail server device according to claim 3, wherein a predetermined character string is added in a user name of the public e-mail address, thereby achieving the character conversion of the public e-mail address.

5. The e-mail server device according to claim 1, further comprising a rewriting unit which rewrites the public e-mail address owned by the addresser specified in the e-mail into the individual e-mail address owned by the addresser recorded in association with the addresser and the addressee, in a case where rewriting conditions that (i) the addresser of the received e-mail is the public e-mail address owned by the user specified in the user information managed by said e-mail server device, and that (ii) the individual address recorder records information representing the addressee of the received e-mail as an informed addresser and information representing the user owning the public e-mail address as a target user, in association with a corresponding individual e-mail address, are satisfied, and wherein said transfer unit transfers an e-mail having the address rewritten by the rewriter instead of the received e-mail, in a case where the above rewriting conditions are satisfied.

6. A method for providing an e-mail service for managing information regarding at least one user and his/her e-mail address and for sending e-mails to the at least one user, the user information specifying an e-mail address as a public e-mail address owned by the at least one user and another e-mail address as an individual e-mail address owned by the at least one user, said method comprising the steps of:

receiving an e-mail;

transferring the received e-mail to another e-mail server device, in a case where an address of the received e-mail is not managed by said method for managing the e-mail service:

inquiring of the at least one user whether to accept the received e-mail to be delivered, in a case where the address of the received e-mail is a public e-mail address of owned by the at least one user which is managed by said method for providing e-mail service;

informing, in a case where the received e-mail is not accepted to be delivered from an addresser of the e-mail as a result of inquiring of the user, the user of the received e-mail that there is no user owning the address of the received e-mail;

delivering the received e-mail to a user owning the public e-mail address, in a case where a delivery condition for delivering the received e-mail is satisfied;

selecting the individual e-mail address managed by said method for providing an email service, in association with the user owning the public e-mail address corresponding to the addressee of the received e-mail and with the addresser of the received e-mail, in a case where the received e-mail is accented to be delivered from the addresser as a result of the inquiring;

informing the addresser of the received e-mail about the selected individual e-mail address; and recording information representing the user as a target user owning the public e-mail address corresponding to the addressee of the received e-mail and information representing the addresser as an informed-addresser which is informed about the individual e-mail address, and wherein the delivery condition is satisfied, in a case where the addressee of the received e-mail is the individual e-mail address recorded at said individual address recording step and where information representing the addresser of the received e-mail is recorded as an informed-addresser, thereby the e-mail is delivered to the user specified as the target user in the recorded information at said delivering step.

7. The method according to claim 6, further comprising the step of recording information representing the addresser of the received e-mail as an allowed addresser, in association with the public e-mail address, in a case where e-mails are accepted to be delivered from the addresser of the received e-mail as a result of the inquiry, and wherein the delivery condition is satisfied, in a case where information specifying the addresser of the received e-mail is recorded as an allowed addresser in association with the public e-mail address corresponding to the addressee of the received e-mail at said the information recording step.

8. The method according to claim 6, wherein:

a resultant address created by converting a character code of the public e-mail address corresponding to the addressee of the received e-mail is selected as an individual e-mail address at said individual-address selecting step; and the original public e-mail address is generated from the individual e-mail address as a resultant address of the character conversion, thereby achieving character reverse conversion of the individual e-mail address.

9. The method according to claim 8, wherein the character conversion is so performed that a resultant address including a predetermined character string in a user name of the public e-mail address is obtained.

10. The method according to claim 6, further comprising the step of rewriting the public e-mail address of the addresser specified in the e-mail into the individual e-mail address of the addresser recorded in association with the addresser and the addressee, in a case where rewriting conditions that (i) the addresser of the received e-mail is the public e-mail address owned by the user specified in the user information managed by said e-mail sever device, and that (ii) information representing the addressee of the received e-mail as an informed addresser and information representing the user owning the public e-mail address as a target user are recorded at said individual-address recording step, in association with a corresponding individual e-mail address, are satisfied, and wherein an e-mail having the address rewritten by the rewriter instead of the received e-mail is transferred at said transferring step, in a case where the above rewriting conditions are satisfied.

11. A computer readable information recording medium which records a program for controlling a computer to function as said e-mail server device according to claim 1.

12. The computer readable information recording medium according to claim 11, wherein said information recording medium is a computer disk, a floppy disk, a hard disk, a magneto-optical disk, a digital video disk, a magnetic tape, or a semiconductor memory.

13. A computer readable information recording medium which records a program for controlling a computer to execute the method for providing an e-mail service, according to claim 6.

* * * * *